(12) United States Patent
Kuse et al.

(10) Patent No.: US 11,987,870 B2
(45) Date of Patent: May 21, 2024

(54) CU-BASED ALLOY POWDER

(71) Applicant: Sanyo Special Steel Co., Ltd., Himeji (JP)

(72) Inventors: Tetsuji Kuse, Himeji (JP); Yoshikazu Aikawa, Himeji (JP); Yuichi Nagatomi, Himeji (JP)

(73) Assignee: Sanyo Special Steel Co., Ltd., Himeji (JP)

( * ) Notice: Subject to any disclaimer, the term of this patent is extended or adjusted under 35 U.S.C. 154(b) by 174 days.

(21) Appl. No.: 17/621,530

(22) PCT Filed: Jul. 17, 2020

(86) PCT No.: PCT/JP2020/027806
§ 371 (c)(1),
(2) Date: Dec. 21, 2021

(87) PCT Pub. No.: WO2021/015119
PCT Pub. Date: Jan. 28, 2021

(65) Prior Publication Data
US 2022/0349029 A1    Nov. 3, 2022

(30) Foreign Application Priority Data
Jul. 23, 2019    (JP) .............................. 2019-135294

(51) Int. Cl.
C22C 9/00    (2006.01)
B22F 1/00    (2022.01)
B22F 1/05    (2022.01)
B22F 1/06    (2022.01)
B22F 1/065    (2022.01)
C22C 9/06    (2006.01)

(52) U.S. Cl.
CPC ............... *C22C 9/00* (2013.01); *B22F 1/00* (2013.01); *B22F 1/05* (2022.01); *B22F 1/06* (2022.01); *B22F 1/065* (2022.01); *C22C 9/06* (2013.01); *B22F 2301/10* (2013.01); *B22F 2304/10* (2013.01)

(58) Field of Classification Search
CPC .... C22C 9/00; C22C 9/01; C22C 9/02; C22C 9/04; C22C 9/05; C22C 9/06; C22C 9/08; C22C 9/10; C22C 1/0425; B22F 1/00; B22F 1/05; B22F 1/06; B22F 1/065; B22F 1/07; B22F 2301/10
See application file for complete search history.

(56) References Cited

U.S. PATENT DOCUMENTS

| 8,329,092 | B2 | 12/2012 | Fuwa et al. |
| 9,067,262 | B1 | 6/2015 | Deinzer |
| 10,017,840 | B2 | 7/2018 | Goto et al. |
| 10,421,122 | B2 | 9/2019 | Tsubota et al. |
| 10,557,184 | B2 | 2/2020 | Goto et al. |
| 10,981,226 | B2 | 4/2021 | Tsubota et al. |
| 2015/0255195 | A1 | 9/2015 | Muramatsu |
| 2016/0332227 | A1 | 11/2016 | Tsubota et al. |
| 2017/0182557 | A1 | 6/2017 | Tsubota et al. |
| 2018/0111199 | A1 | 4/2018 | Tsubota et al. |
| 2018/0354033 | A1* | 12/2018 | Morinaka ................. C22C 9/00 |
| 2019/0194778 | A1* | 6/2019 | Masuda .................... C22C 9/06 |
| 2020/0122236 | A1* | 4/2020 | Yoshida .................... B22F 1/05 |
| 2021/0230717 | A1 | 7/2021 | Kuse et al. |

FOREIGN PATENT DOCUMENTS

| CN | 103074517 A |   | 5/2013 |   |
| CN | 106623953 A | * | 5/2017 | ............ B22F 1/0088 |
| CN | 107971489 A |   | 5/2018 |   |
| CN | 109112346 A |   | 1/2019 |   |
| DE | 1031093 B |   | 5/1958 |   |
| EP | 2927913 A1 |   | 10/2015 |   |
| EP | 3135780 A1 |   | 3/2017 |   |
| EP | 3315229 A1 |   | 5/2018 |   |
| GB | 811507 A |   | 4/1959 |   |
| JP | 2001131655 A |   | 5/2001 |   |
| JP | 2005314806 A |   | 11/2005 |   |

(Continued)

OTHER PUBLICATIONS

Anderson et al., "Microstructural Size Effects in High-Strength High-Conductivity Cu—Cr—Nb Alloys," Metallurgical and Materials Transactions A, 2001, pp. 1211-1224, vol. 32(A).

Jadhav et al., "SLM of Cu10Ni using in-house gas atomised powder," Department of Materials Engineering (MTM), KU Leuven, 2017, pp. 1-16.

Muramatsu et al., "Microstructures and Mechanical and Electrical Properties of Hypoeutectic Cu-1, C-3, and Cu-5 at % Zr Alloy Wires Preprocessed by Spark Plasma Sintering," Materials Transactions, 2013, pp. 1213-1219, vol. 54:7.

Zhang et al., "Microstructure and properties of high strength and high conductivity Cu—Cr alloy components fabricated by high power selective laser melting," Materials Letters, 2019, pp. 306-309, vol. 237.

*Primary Examiner* — Ricardo D Morales

(74) *Attorney, Agent, or Firm* — The Webb Law Firm

(57) ABSTRACT

Provided is a Cu-based alloy powder that is suitable for a process involving rapid melting and rapid solidification and that can provide a shaped object superior in characteristics. The powder is composed of a Cu-based alloy, which contains an element M being one or more elements selected from Cr, Fe, Ni, Zr, and Nb: 0.1% by mass or more and 10.0% by mass or less, Si: more than 0% by mass and 0.20% by mass or less, P: more than 0% by mass and 0.10% by mass or less, and S: more than 0% by mass and 0.10% by mass or less, the balance being Cu and inevitable impurities. This powder has a ratio (D50/TD) of the average particle diameter D50 (μm) thereof to the tap density TD (Mg/m$^3$) is $0.2 \times 10^{-5}$·m$^4$/Mg or more and $20 \times 10^{-5}$·m$^4$/Mg or less, and has a sphericity of 0.80 or more and 0.95 or less.

5 Claims, No Drawings

(56) References Cited

FOREIGN PATENT DOCUMENTS

| | | |
|---|---|---|
| JP | 4661842 B2 | 3/2011 |
| JP | 2016125102 A | 7/2016 |
| JP | 2016183401 A | 10/2016 |
| JP | 2016211062 A | 12/2016 |
| JP | 2017115220 A | 6/2017 |
| JP | 6296558 B2 | 3/2018 |
| WO | 2014083977 A1 | 6/2014 |
| WO | 2016181924 A1 | 11/2016 |
| WO | WO-2018043681 A1 * 3/2018 ................ B22F 1/00 |
| WO | 2018079002 A1 | 5/2018 |
| WO | WO-2018123809 A1 * 7/2018 ............ B22F 1/0003 |
| WO | 2018199110 A1 | 11/2018 |
| WO | 2019230018 A1 | 12/2019 |

\* cited by examiner

CU-BASED ALLOY POWDER

CROSS-REFERENCE TO RELATED APPLICATIONS

This application is the United States national phase of International Application No. PCT/JP2020/027806 filed Jul. 17, 2020, and claims priority to Japanese Patent Application No. 2019-135294 filed Jul. 23, 2019, the disclosures of which are hereby incorporated by reference in their entirety.

BACKGROUND OF THE INVENTION

Field of the Invention

The present invention relates to a metal powder that is suitable for a process involving rapid melting and rapid solidification, such as three-dimensional additive manufacturing, thermal spraying, laser coating, and weld overlaying. In detail, the present invention relates to a powder made of a Cu-based alloy.

Description of the Related Art 3D printers are used for producing a shaped object composed of a metal. With the 3D printers, a shaped object is produced by additive manufacturing. In additive manufacturing, a spread metal powder is irradiated with a laser beam or an electron beam. Metal particles of the powder melt by the irradiation. The particles thereafter solidify. By this melting and solidification, the particles are bonded to one another. The irradiation is performed selectively on a part of the metal powder. The unirradiated part of the powder does not melt. A bonded layer is formed only at the irradiated part.

On the bonded layer, the metal powder is further spread. This metal powder is irradiated with the laser beam or the electron beam. The metal particles melt by the irradiation. The metal thereafter solidifies. By this melting and solidification, the particles in the powder are bonded to one another and a new bonded layer is formed. The new bonded layer is also bonded to the existing bonded layer.

When the bonding by the irradiation is repeated, an aggregate of the bonded layers thereby grows gradually. By this growth, a shaped object having a three-dimensional shape is obtained. By additive manufacturing, a shaped object having a complicated shape is obtained easily. JP4661842B discloses one example of additive manufacturing.

High conductivity is required in alloys used for a high-frequency induction heating apparatus, a heat sink for cooling a motor, and the like. Cu-based alloys are suitable for such applications.

JP6296558B discloses a Cu-based alloy containing Cu as the main component and Zr. The content of Zr in this Cu-based alloy is 5 at % to 8 at %.

JP2005-314806A discloses a nano-crystal powder containing Cu as the main component and Zr. The content of Zr in the Cu alloy that composes this powder is 0.05% by mass to 45% by mass. The particle size of this powder is from 2 nm to 1000 nm.

CITATION LIST

Patent Literature

[Patent Literature 1] JP4661842B
[Patent Literature 2] JP6296558B
[Patent Literature 3] JP2005-314806A

SUMMARY OF INVENTION

In additive manufacturing, a metal material is melted rapidly and quenched to solidify. Conventional Cu-based alloys are unsuitable as a powder used for a process involving such rapid melting and rapid solidification. For example, a high-density shaped object is hard to obtain from a conventional Cu-based alloy powder. Conventional Cu-based alloys are also unsuitable for other rapid melting and rapid solidification processes, such as thermal spraying, laser coating, and weld overlaying.

An object of the present invention is to provide a Cu-based alloy powder that is suitable for a process involving rapid melting and rapid solidification and that can provide a shaped object superior in characteristics.

The present invention provides the following items:

[Item 1]

A powder made of a Cu-based alloy, wherein the Cu-based alloy comprises:
  an element M being one or more elements selected from Cr, Fe, Ni, Zr, and Nb: 0.1% by mass or more and 10.0% by mass or less,
  Si: more than 0% by mass and 0.20% by mass or less,
  P: more than 0% by mass and 0.10% by mass or less, and
  S: more than 0% by mass and 0.10% by mass or less,
  the balance being Cu and inevitable impurities,
  wherein D50/TD being a ratio of an average particle diameter D50 (μm) of the powder to a tap density TD (Mg/m$^3$) of the powder is $0.2 \times 10^{-5} \cdot \text{m}^4/\text{Mg}$ or more and $20 \times 10^{-5} \cdot \text{m}^4/\text{Mg}$ or less, and
  wherein the powder has a sphericity of 0.80 or more and 0.95 or less.

[Item 2]

The powder according to item 1, wherein the Cu-based alloy comprises 0.2% by mass or more and 5.0% by mass or less of the element M.

[Item 3]

The powder according to item 1, wherein the Cu-based alloy comprises 0.5% by mass or more and 3.0% by mass or less of the element M.

[Item 4]

The powder according to any one of items 1 to 3, wherein the Cu-based alloy comprises 0.10% by mass or less of Si, 0.010% by mass or less of P, and 0.010% by mass or less of S.

[Item 5]

The powder according to any one of items 1 to 4, wherein a metallographic structure of the Cu-based alloy has:
  a matrix phase rich in Cu,
  a grain boundary phase rich in the element M, and
  a compound $Cu_m M_n$ (wherein m and n each represent a natural number, and a ratio of m/n is 4.0 or more) dispersed in the matrix phase and having a size of 1 nm or more and 300 nm or less.

A shaped object superior in characteristics is obtained from the Cu-based alloy powder of the present invention by a process involving rapid melting and rapid solidification.

DESCRIPTION OF THE INVENTION

A powder of the present invention is aggregation of a large number of particles. These particles are composed of a Cu-based alloy. This Cu-based alloy contains one or more elements M selected from Cr, Fe, Ni, Zr, and Nb.

The laser reflectance of pure Cu is higher than the laser reflectance of a Fe-based alloy, a Ni-based alloy, a Co-based alloy, and the like. When a powder of pure Cu is used for a process involving rapid melting and rapid solidification, a large amount of heat is released to the atmosphere due to the high laser reflectance. Accordingly, the heat that is sufficient for the powder to melt is not given to this powder. The lack of heat brings about a failure in bonding among particles. Due to the lack of heat, unmolten particles remain inside a shaped object obtained from this powder. The relative density of this shaped object is low.

If the pure Cu powder is irradiated with laser having high energy density, it is suppressed that unmolten particles remain. However, the laser having high energy density brings about bumping of the molten metal. This bumping is a cause for voids inside the shaped object.

As a result of diligent studies, the present inventors have found that a high-density shaped object can be prepared by addition of a predetermined amount of Cr, Fe, Ni, Zr, or Nb to Cu. This shaped object is superior in electroconductivity.

[Element M]

The element M is selected from the group consisting of Cr (chromium), Fe (iron), Ni (nickel), Zr (zirconium), and Nb (niobium). The solid solubility limit of each of Cr, Fe, Ni, Zr, and Nb in Cu on the equilibrium diagram is small. However, when the powder is obtained by a method involving rapid solidification, such as atomization, the element M is dissolved in Cu in a supersaturated state. In this supersaturated solid solution, the laser reflectance is suppressed. Even when this powder is used for a process involving rapid melting and rapid solidification, heat is unlikely to be released to the atmosphere. In this process, irradiation with laser having excessively high energy density is unnecessary. Accordingly, bumping of molten metals is suppressed. By this process, a shaped object having large relative density and having a small number of voids in the inside can be obtained.

[Content of Element M]

The total content P of the element M is preferably 0.1% by mass or more and 10.0% by mass or less. A shaped object having large relative density can be obtained from the powder having a total content P of 0.1% by mass or more. From this viewpoint, the total content P is more preferably 0.2% by mass or more and particularly preferably 0.5% by mass or more. A shaped object superior in electroconductivity can be obtained from the powder having a total content P of 10.0% by mass or less. From this viewpoint, the total content P is preferably 5.0% by mass or less and particularly preferably 3.0% by mass or less. Accordingly, the total content P of the element M is preferably 0.1% by mass or more and 10.0% by mass or less, more preferably 0.2% by mass or more and 5.0% by mass or less, and still more preferably 0.5% by mass or more and 3.0% by mass or less.

[Other Elements]

Besides the element M, the Cu-based alloy contains the elements described below:
Si: more than 0% by mass and 0.20% by mass or less;
P: more than 0% by mass and 0.10% by mass or less; and
S: more than 0% by mass and 0.10% by mass or less.
Preferably, the balance is Cu and inevitable impurities.

[Si (Silicon)]

Si is dissolved in Cu and inhibits the electric conduction and heat conduction of the Cu-based alloy. From this viewpoint, the content of Si is preferably 0.20% by mass or less, more preferably 0.10% by mass or less, and particularly preferably 0.05% by mass or less. The content of Si is not particularly limited as long as it is more than 0% by mass, but is typically 0.001% by mass or more, and more typically 0.002% by mass or more. Accordingly, the content of Si is preferably more than 0% by mass and 0.20% by mass or less, more preferably 0.001% by mass or more and 0.10% by mass or less, and particularly preferably 0.002% by mass or more and 0.05% by mass or less.

[P (Phosphorus)]

P is dissolved in Cu and inhibits the electric conduction and heat conduction of the Cu-based alloy. From this viewpoint, the content of P is preferably 0.10% by mass or less, more preferably 0.010% by mass or less, and particularly preferably 0.005% by mass or less. The content of P is not particularly limited as long as it is more than 0% by mass, but is typically 0.0001% by mass or more, and more typically 0.0002% by mass or more. Accordingly, the content of P is preferably more than 0% by mass and 0.10% by mass or less, more preferably 0.0001% by mass or more and 0.010% by mass or less, and particularly preferably 0.0002% by mass or more and 0.005% by mass or less.

[S (Sulfur)]

S is dissolved in Cu and inhibits the electric conduction and heat conduction of the Cu-based alloy. From this viewpoint, the content of S is preferably 0.10% by mass or less, more preferably 0.010% by mass or less, and particularly preferably 0.005% by mass or less. The content of S is not particularly limited as long as it is more than 0% by mass, but is typically 0.0001% by mass or more, and more typically 0.0002% by mass or more. Accordingly, the content of S is preferably more than 0% by mass and 0.10% by mass or less, more preferably 0.0001% by mass or more and 0.010% by mass or less, and particularly preferably 0.0002% by mass or more and 0.005% by mass or less.

[Structure]

A metallographic structure of the Cu-based alloy has:
(1) a matrix phase rich in Cu (containing a large amount of Cu),
(2) a grain boundary phase rich in the element M (containing a large amount of the element M), and
(3) a compound $Cu_mM_n$ (wherein m and n each represent a natural number, and a ratio of m/n is 4.0 or more) dispersed in the matrix phase and having a size of 1 nm or more and 300 nm or less.

The main component of the matrix phase (1) is Cu. The matrix phase may consist of Cu. The matrix phase may be composed of Cu and a dissolved element. Accordingly, the matrix phase (1) is rich in Cu, and this means that the content of Cu in the matrix phase (1) is higher than the content of Cu in the grain boundary phase (2). For example, the content of Cu in the matrix phase is typically 80% by mass or more.

The main component of the grain boundary phase (2) is a compound of Cu and the element M. The grain boundary phase (2) may contain a single phase of the element M. Accordingly, the grain boundary phase (2) is rich in the element M, and this means that the content of the element M in the grain boundary phase (2) is higher than the content of the element M in the matrix phase (1). For example, the content of the element M in the grain boundary phase (2) is typically 5% by mass or more.

The Cu-based alloy containing the compound (3) having a size of 1 nm or more is superior in laser absorbency. A shaped object having large relative density can be obtained from this Cu-based alloy. From this viewpoint, the size of the compound $Cu_mM_n$ is more preferably 2 nm or more and particularly preferably 3 nm or more. The size is preferably 300 nm or less. The size refers to a diameter of a circle circumscribed to the contour shape of the compound in a photograph of a cross section of the metallographic structure. Accordingly, the size of the compound $Cu_mM_n$ is preferably 1 nm or more and 300 nm or less, more preferably 2 nm or more and 300 nm or less, and particularly preferably 3 nm or more and 300 nm or less.

As mentioned previously, a shaped object having large relative density can be obtained from the powder containing the element M. On the other hand, there is a possibility that the element M inhibits the electroconductivity of this shaped object. In the Cu-based alloy in which the metallographic structure has the previously mentioned matrix phase (1), grain boundary phase (2), and compound (3), the inhibition of the electroconductivity by the element M can be suppressed. In this Cu-based alloy, the matrix phase (1) contributes to the electroconductivity. A shaped object superior in electroconductivity can be obtained from this Cu-based alloy.

From the viewpoint of the electroconductivity of the shaped object, the ratio of m/n is more preferably 9 or more and particularly preferably 19 or more. The ratio of m/n is typically 50 or less, and more typically 40 or less although the upper limit value is not particularly limited. Accordingly, the ratio of m/n is more preferably 9 or more and 50 or less, and particularly preferably 19 or more and 40 or less.

[Particle Diameter of Powder]

The average particle diameter D50 of the powder is preferably 15 µm or more and 50 µm or less. The powder having an average particle diameter D50 of 15 µm or more is superior in fluidity. From this viewpoint, the average particle diameter D50 is more preferably 20 µm or more and particularly preferably 25 µm or more. A shaped object having large relative density can be obtained from the powder having an average particle diameter D50 of 50 µm or less. From this viewpoint, the average particle diameter D50 is more preferably 40 µm or less and particularly preferably 30 µm or less. Accordingly, the average particle diameter D50 of the powder is preferably 15 µm or more and 50 µm or less, more preferably 20 µm or more and 40 µm or less, and particularly preferably 25 µm or more and 30 µm or less.

In the measurement of the average particle diameter D50, a cumulative curve is determined assuming the whole volume of the powder to be 100%. The particle diameter at a point, on this curve, where the cumulative volume is 50% is the average particle diameter D50. The average particle diameter D50 is measured by laser diffraction/scattering. Examples of the apparatus that is suitable for this measurement include a laser diffraction/scattering particle diameter distribution analyzer "Microtrac MT3000" from NIKKISO CO., LTD. The powder is poured together with pure water into the cell of this apparatus to detect particle diameters based on the information on light scattering from particles.

[Tap Density]

From the viewpoint of easiness of production of a shaped object, the tap density TD of this powder is preferably 0.10 Mg/m$^3$ or more and 0.40 Mg/m$^3$ or less, and particularly preferably 0.15 Mg/m$^3$ or more and 0.35 Mg/m$^3$ or less.

The tap density is measured in accordance with the regulation of "JIS Z 2512." In the measurement, a cylinder having a volume of 100 cm$^3$ is filled with about 50 g of the powder to measure the density. The measurement condition is as follows:

Drop height: 10 mm
Number of taps: 200

[D50/TD]

A ratio D50/TD ($10^{-5} \cdot m^4/Mg$) of the average particle diameter D50 (µm) to the tap density (Mg/m$^3$) is preferably 0.2 or more and 20 or less. The powder having a ratio D50/TD ($10^{-5} \cdot m^4/Mg$) of 0.2 or more is superior in fluidity. From this viewpoint, the ratio D50/TD ($10^{-5} \cdot m^4/Mg$) is more preferably 0.5 or more and particularly preferably 5 or more. A shaped object having large relative density can be obtained from the powder having a ratio D50/TD ($10^{-5} \cdot m^4/Mg$) of 20 or less. From this viewpoint, the ratio D50/TD ($10^{-5} \cdot m^4/Mg$) is more preferably 18 or less and particularly preferably 15 or less. Accordingly, D50/TD ($10^{-5} \cdot m^4/Mg$) is preferably 0.2 or more and 20 or less, more preferably 0.5 or more and 18 or less, and particularly preferably 5 or more and 15 or less.

[Sphericity]

The sphericity of the powder is preferably 0.80 or more and 0.95 or less. The powder having a sphericity of 0.80 or more is superior in fluidity. From this viewpoint, the sphericity is more preferably 0.83 or more and particularly preferably 0.85 or more. In the powder having a sphericity of 0.95 or less, the reflection of laser can be suppressed. From this viewpoint, the sphericity is more preferably 0.93 or less and particularly preferably 0.90 or less. Accordingly, the sphericity of the powder is preferably 0.80 or more and 0.95 or less, more preferably 0.83 or more and 0.93 or less, and particularly preferably 0.85 or more and 0.90 or less.

In the measurement of the sphericity, a test piece obtained by embedding the powder in a resin is provided. This test piece is subjected to mirror polishing, and the polished surface is observed with an optical microscopic. The magnification of the microscope is set to 100 times. Image analysis is performed on 20 particles extracted at random, and the sphericity of these particles is measured. The average of 20 measured values is defined as the sphericity of the powder. The sphericity of a particle refers to a ratio, to the length of the longest line segment that can be drawn in the contour of this particle, of the length in the direction perpendicular to the longest line segment.

[Method for Producing Powder]

Examples of the method for producing the powder include water atomization, single roll quenching, twin roll quenching, gas atomization, disc atomization, and centrifugal atomization. Preferred production methods are single roll quenching, gas atomization, and disc atomization. Mechanical milling or the like may be performed on the powder. Examples of the milling include ball milling, bead milling, and planetary ball milling, attritor milling, and vibration ball milling.

[Shaping]

Various shaped objects can be produced from the metal powder of the present invention. This method for producing a shaped object includes:

(1) a step of providing the metal powder; and
(2) a step of melting and solidifying this metal powder, thereby obtaining a shaped object which has not been heat-treated yet. Examples of the step of melting and solidifying the metal powder include a rapid melting and rapid solidification process. Specific examples of this process include three-dimensional additive manufacturing, thermal spraying, laser coating, and weld overlaying. This metal powder is suitable for three-dimensional additive manufacturing in particular.

A 3D printer can be used for this additive manufacturing. In this additive manufacturing, a spread metal powder is irradiated with a laser beam or an electron beam. Particles are heated rapidly and melt rapidly by the irradiation. Thereafter, the particles solidify rapidly. By this melting and solidification, the particles are bonded to one another. The irradiation is performed selectively on a part of the metal powder. The unirradiated part of the powder does not melt. A bonded layer is formed only at the irradiated part.

On the bonded layer, the metal powder is further spread. This metal powder is irradiated with the laser beam or the electron beam. The particles melt rapidly by the irradiation. Thereafter, the particles solidify rapidly. By this melting and the solidification, the particles in the powder are bonded to one another and a new bonded layer is formed. The new bonded layer is also bonded to the existing bonded layer.

When the bonding by the irradiation is repeated, an aggregate of the bonded layers thereby grows gradually. By this growth, a shaped object having a three-dimensional shape is obtained. By this additive manufacturing, a shaped object having a complicated shape is obtained easily.

[Conditions of Shaping]

The energy density E.D. during performing sintering by a rapid melting and rapid solidification process, such as additive manufacturing, is preferably 120 J/mm$^3$ or more and 250 J/mm$^3$ or less. When the energy density E.D. is 120 J/mm$^3$ or more, sufficient heat is given to the powder. Accordingly, it is suppressed that the unmolten powder remains inside the shaped object. This shaped object has large relative density. From this viewpoint, the energy density E.D. is more preferably 130 J/mm$^3$ or more and particularly preferably 140 J/mm$^3$ or more. When the energy density E.D. is 250 J/mm$^3$ or less, excessive heat is not given to the powder. Accordingly, bumping of the molten metals is suppressed and pores inside the shaped object are suppressed. From this viewpoint, the energy density E.D. is more preferably 240 J/mm$^3$ or less and particularly preferably 230 J/mm$^3$ or less.

[Relative Density]

The relative density of the shaped object obtained by the rapid melting and rapid solidification process (that is, the shaped object before the heating treatment, which will be mentioned later, is performed) is preferably 90% or more. This shaped object which has not been heat-treated yet is superior in size accuracy and electroconductivity. From this viewpoint, the relative density is more preferably 93% or more and still more preferably 95% or more.

The relative density is calculated based on the ratio of the density of a 10 mm square test piece prepared by additive manufacturing or the like to the bulk density of the powder which is a raw material. The density of the 10 mm square test piece is measured by the Archimedes' method. The bulk density of the powder is measured with a dry type density measuring device.

[Heat Treatment]

Preferably, the method for producing a shaped object further includes (3) a step of performing a heat treatment on the shaped object which has not been heat-treated yet and which is obtained in the step (2), thereby obtaining a shaped object. A preferred heat treatment is an aging treatment. The single phase of the element M or the compound of Cu and the element M precipitates at the grain boundaries by the aging treatment. By this deposition, the purity of Cu in the matrix phase is enhanced. This matrix phase can contribute to the electroconductivity of the shaped object.

[Conditions of Heat Treatment]

In the aging, the untreated shaped object is retained at a predetermined temperature for a predetermined time. The aging temperature is preferably 350° C. or higher and 1000° C. or lower. By the aging at a temperature of 350° C. or higher, a structure in which the single phase of the element M and/or the compound are deposited sufficiently is obtained. From this viewpoint, the aging temperature is more preferably 400° C. or higher and particularly preferably 450° C. or higher. By the aging at a temperature of 1000° C. or lower, dissolution of the element M in the matrix phase is suppressed. From this viewpoint, the aging temperature is more preferably 950° C. or lower and particularly preferably 900° C. or lower.

The aging time is preferably 1 hour or longer and 10 hours or shorter. By the aging for 1 hours or longer, a structure in which the single phase of the element M and/or the compound are deposited sufficiently is obtained. From this viewpoint, the aging time is more preferably 1.3 hours or longer and particularly preferably 1.5 hours or longer. By the aging for 10 hours or shorter, the energy cost is suppressed. From this viewpoint, the time is more preferably 9.7 hours or shorter and particularly preferably 9.5 hours or shorter.

[Electric Conductivity of Shaped Object]

The electric conductivity of the shaped object after the heat treatment is preferably 30 IACS % or more. The shaped object having an electric conductivity of 30 IACS % or more is superior in electroconductivity. From this viewpoint, the electric conductivity is more preferably 40 IACS % or more and particularly preferably 50 IACS % or more.

EXAMPLES

Hereinafter, the effect of the present invention will be made clear by Examples, but the present invention should not be construed as limiting based on the description of these Examples.

[Production of Powder]

A raw material having a predetermined composition was heated and melted in a crucible made of alumina by high-frequency induction heating in vacuum. The molten metal was dropped from a nozzle, which was present under the crucible and had a diameter of 5 mm. An argon gas was sprayed to this molten metal to obtain a large number of particles. These particles were classified to remove particles having a diameter exceeding 63 μm and obtain a Cu-based alloy powder. The details on the composition of each powder are shown in Tables 1 and 2 below.

[Shaping]

Additive manufacturing with a three-dimensional additive manufacturing apparatus (EOS-M280) was performed using this powder as a raw material to obtain a shaped object which had not been heat-treated yet. The energy density E.D. in the additive manufacturing is shown in Tables 1 and 2 below. The shape of the shaped object was a cube, which had a length of a side of 10 mm.

[Heat Treatment]

A heat treatment (aging treatment) was performed on the shaped object which had not been heat-treated yet. The aging temperature and the aging time are shown in Tables 1 and 2 below.

[Identification of Deposit]

A thin film-like test piece was prepared from the shaped object described above by FIB (Focused Ion Beam) processing. This test piece was observed with a transmission electron microscope (TEM), and the composition of the compound was identified at 10 points (one point is a 2 μm×2 μm region) extracted at random. It was ascertained that each Cu-based alloy was a metallographic structure containing the matrix phase (1), the grain boundary phase (2), and the compound (3). Further, the ratio (m/n) was calculated. This result is shown in Tables 1 and 2 below.

[Measurement of Electric Conductivity]

A test piece (3×2×60 mm) was prepared, and the electric resistance value (Ω) was measured by a four-terminal method in accordance with "JIS C 2525." An apparatus "TER-2000RH Model" from ULVAC-RIKO, Inc. was used for the measurement. The measurement condition is as follows:

Temperature: 25° C.
Current: 4 A
Voltage drop distance: 40 mm

The electric resistivity $\rho(\Omega m)$ was calculated based on the numerical expression described below.

$$\rho = R/I \times S$$

In this numerical expression, R represents an electric resistance value ($\Omega$) of the test piece, I represents a current (A), and S represents a cross-sectional area ($m^2$) of the test piece. The electric conductivity (S/m) was calculated from the reciprocal number of the electric resistivity $\rho$. Further, the electric conductivity (% IACS) of each test piece was calculated assuming $5.9 \times 10^7$ (S/m) to be 100% IACS. This result is shown in Tables 1 and 2 below.

[Rating]

Each metal powder was rated based on the following criteria on the electric conductivity of the shaped object.

Evaluation 1: The electric conductivity is 90% IACS or more.
Evaluation 2: The electric conductivity is 70% IACS or more and less than 90% IACS.
Evaluation 3: The electric conductivity is 50% IACS or more and less than 70% IACS.
Evaluation 4: The electric conductivity is 40% IACS or more and less than 50% IACS.
Evaluation 5: The electric conductivity is less than 40% IACS.

This result is shown in Tables 1 and 2 below.

TABLE 1

| | Composition (% by mass) | | | | | | | | | D50/TD $10^{-5}$ $m^4$/Mg | Sphericity | $Cu_mM_n$ m/n | Size nm | E.D. J/$mm^3$ | Relative density % | Heat treatment Temp. ° C. | Heat treatment Time h | Electric conductivity % IACS | Evaluation |
|---|---|---|---|---|---|---|---|---|---|---|---|---|---|---|---|---|---|---|---|
| | Element-Content | | | | | | Si | P | S | | | | | | | | | | |
| Ex. 1 | Cr | 0.2 | — | — | — | — | — | 0.10 | 0.005 | 0.001 | 12 | 0.90 | 19 | 1 | 200 | 95.7 | 800 | 5 | 50 | 3 |
| Ex. 2 | Cr | 10.0 | — | — | — | — | — | 0.10 | 0.005 | 0.001 | 14 | 0.90 | 4 | 200 | 200 | 99.7 | 800 | 5 | 63 | 3 |
| Ex. 3 | Fe | 0.2 | — | — | — | — | — | 0.10 | 0.005 | 0.001 | 10 | 0.90 | 19 | 3 | 200 | 95.5 | 800 | 5 | 48 | 4 |
| Ex. 4 | Fe | 10.0 | — | — | — | — | — | 0.10 | 0.005 | 0.001 | 12 | 0.90 | 4 | 200 | 200 | 99.7 | 800 | 5 | 60 | 3 |
| Ex. 5 | Ni | 0.2 | — | — | — | — | — | 0.10 | 0.005 | 0.001 | 14 | 0.90 | 19 | 3 | 200 | 95.6 | 800 | 5 | 46 | 4 |
| Ex. 6 | Ni | 10.0 | — | — | — | — | — | 0.10 | 0.005 | 0.001 | 10 | 0.90 | 4 | 200 | 200 | 99.8 | 800 | 5 | 57 | 3 |
| Ex. 7 | Zr | 0.2 | — | — | — | — | — | 0.10 | 0.005 | 0.001 | 0.2 | 0.90 | 19 | 5 | 200 | 95.6 | 800 | 5 | 55 | 3 |
| Ex. 8 | Zr | 10.0 | — | — | — | — | — | 0.10 | 0.005 | 0.001 | 0.5 | 0.90 | 4 | 250 | 200 | 99.9 | 800 | 5 | 68 | 3 |
| Ex. 9 | Nb | 0.2 | — | — | — | — | — | 0.10 | 0.005 | 0.001 | 10 | 0.90 | 19 | 3 | 200 | 95.3 | 800 | 5 | 41 | 4 |
| Ex. 10 | Nb | 10.0 | — | — | — | — | — | 0.10 | 0.005 | 0.001 | 15 | 0.90 | 4 | 300 | 200 | 99.6 | 800 | 5 | 48 | 4 |
| Ex. 11 | Cr | 0.5 | Fe | 0.5 | — | — | — | 0.10 | 0.005 | 0.001 | 12 | 0.80 | 19 | 10 | 200 | 98.2 | 800 | 5 | 80 | 2 |
| Ex. 12 | Cr | 0.5 | Zr | 0.5 | — | — | — | 0.10 | 0.005 | 0.001 | 12 | 0.80 | 19 | 20 | 200 | 98.3 | 800 | 5 | 90 | 1 |
| Ex. 13 | Fe | 2.0 | Ni | 2.0 | — | — | — | 0.10 | 0.005 | 0.001 | 10 | 0.80 | 9 | 40 | 200 | 99.3 | 800 | 5 | 75 | 2 |
| Ex. 14 | Fe | 2.0 | Nb | 2.0 | — | — | — | 0.10 | 0.005 | 0.001 | 8 | 0.95 | 9 | 45 | 200 | 99.0 | 800 | 5 | 72 | 2 |
| Ex. 15 | Ni | 5.0 | Zr | 5.0 | — | — | — | 0.10 | 0.005 | 0.001 | 12 | 0.95 | 4 | 70 | 200 | 99.8 | 800 | 5 | 60 | 3 |
| Ex. 16 | Cr | 0.5 | Ni | 0.5 | Zr | 0.5 | — | 0.20 | 0.100 | 0.100 | 12 | 0.90 | 9 | 100 | 200 | 98.7 | 800 | 1 | 87 | 2 |
| Ex. 17 | Cr | 0.5 | Fe | 0.5 | Nb | 0.5 | — | 0.20 | 0.100 | 0.100 | 14 | 0.90 | 9 | 80 | 200 | 98.6 | 800 | 3 | 85 | 2 |
| Ex. 18 | Ni | 0.5 | Zr | 0.5 | Nb | 0.5 | — | 0.20 | 0.100 | 0.100 | 13 | 0.90 | 9 | 80 | 200 | 99.2 | 800 | 10 | 88 | 2 |

TABLE 2

| | Composition (% by mass) | | | | | | | | | D50/TD $10^{-5}$ $m^4$/Mg | Sphericity | $Cu_mM_n$ m/n | Size nm | E.D. J/$mm^3$ | Relative density % | Heat treatment Temp. ° C. | Heat treatment Time h | Electric conductivity % IACS | Evaluation |
|---|---|---|---|---|---|---|---|---|---|---|---|---|---|---|---|---|---|---|---|
| | Element-Content | | | | | | Si | P | S | | | | | | | | | | |
| Comp. Ex. 1 | Cr | 0.1 | — | — | — | — | — | 0.10 | 0.005 | 0.001 | 13 | 0.90 | 19 | 0.5 | 200 | 85.6 | 800 | 5 | 12 | 5 |
| Comp. Ex. 2 | Cr | 20.0 | — | — | — | — | — | 0.10 | 0.005 | 0.001 | 13 | 0.90 | 1.5 | 500 | 200 | 99.8 | 800 | 5 | 22 | 5 |
| Comp. Ex. 3 | Fe | 0.1 | — | — | — | — | — | 0.10 | 0.005 | 0.001 | 11 | 0.90 | 19 | 3 | 200 | 85.7 | 800 | 5 | 10 | 5 |
| Comp. Ex. 4 | Fe | 20.0 | — | — | — | — | — | 0.10 | 0.005 | 0.001 | 13 | 0.90 | 1.5 | 250 | 200 | 99.9 | 800 | 5 | 20 | 5 |
| Comp. Ex. 5 | Ni | 0.2 | — | — | — | — | — | 0.30 | 0.005 | 0.001 | 13 | 0.90 | 19 | 0.2 | 200 | 95.6 | 800 | 5 | 30 | 5 |
| Comp. Ex. 6 | Ni | 10.0 | — | — | — | — | — | 0.10 | 0.300 | 0.001 | 9 | 0.90 | 1.5 | 120 | 200 | 99.8 | 800 | 5 | 35 | 5 |
| Comp. Ex. 7 | Zr | 0.2 | — | — | — | — | — | 0.10 | 0.005 | 0.300 | 0.2 | 0.90 | 19 | 3 | 200 | 95.6 | 800 | 5 | 28 | 5 |
| Comp. Ex. 8 | Zr | 10.0 | — | — | — | — | — | 0.30 | 0.300 | 0.001 | 0.5 | 0.90 | 1.5 | 250 | 200 | 99.9 | 800 | 5 | 20 | 5 |

TABLE 2-continued

| | | | | | | | | | Composition (% by mass) | | | | D50/TD 10⁻⁵ m⁴/Mg | Sphericity | Cu$_m$M$_n$ m/n | Size nm | E.D. J/mm³ | Relative density % | Heat treatment Temp. °C | Heat treatment Time h | Electric conductivity % IACS | Evaluation |
|---|---|---|---|---|---|---|---|---|---|---|---|---|---|---|---|---|---|---|---|---|---|---|
| | | Element-Content | | | | | | | Si | P | S | | | | | | | | | | | |
| Comp. Ex. 9 | Nb | 0.2 | — | — | — | — | — | — | 0.10 | 0.300 | 0.300 | 9 | 0.90 | 19 | 0.4 | 200 | 95.3 | 800 | 5 | 21 | 5 |
| Comp. Ex. 10 | Nb | 10.0 | — | — | — | — | — | — | 0.30 | 0.300 | 0.300 | 14 | 0.90 | 1.5 | 500 | 200 | 99.6 | 800 | 5 | 10 | 5 |
| Comp. Ex. 11 | Cr | 0.5 | Fe | 0.5 | — | — | — | — | 0.10 | 0.005 | 0.001 | 0.1 | 0.80 | 19 | 5 | 200 | 89.5 | 800 | 5 | 13 | 5 |
| Comp. Ex. 12 | Cr | 0.5 | Zr | 0.5 | — | — | — | — | 0.10 | 0.005 | 0.001 | 25 | 0.80 | 19 | 5 | 200 | 88.3 | 800 | 5 | 15 | 5 |
| Comp. Ex. 13 | Fe | 2.0 | Ni | 2.0 | — | — | — | — | 0.10 | 0.005 | 0.001 | 11 | 0.70 | 9 | 40 | 200 | 89.0 | 800 | 5 | 15 | 5 |
| Comp. Ex. 14 | Fe | 2.0 | Nb | 2.0 | — | — | — | — | 0.10 | 0.005 | 0.001 | 9 | 0.75 | 9 | 50 | 200 | 90.5 | 800 | 5 | 20 | 5 |
| Comp. Ex. 15 | Ni | 5.0 | Zr | 5.0 | — | — | — | — | 0.10 | 0.005 | 0.001 | 13 | 0.98 | 4 | 250 | 200 | 92.0 | 800 | 5 | 39 | 5 |
| Comp. Ex. 16 | Cr | 0.5 | Ni | 0.5 | Zr | 0.5 | — | — | 0.30 | 0.300 | 0.300 | 13 | 0.90 | 9 | 30 | 100 | 95.5 | 800 | 1 | 5 | 5 |
| Comp. Ex. 17 | Cr | 0.5 | Fe | 0.5 | Nb | 0.5 | — | — | 0.30 | 0.300 | 0.300 | 15 | 0.90 | 9 | 25 | 100 | 95.8 | 800 | 3 | 6 | 5 |
| Comp. Ex. 18 | Ni | 0.5 | Zr | 0.5 | Nb | 0.5 | — | — | 0.30 | 0.300 | 0.300 | 13 | 0.90 | 9 | 25 | 300 | 98.6 | 800 | 10 | 11 | 5 |

The superiority of the present invention is clear from the evaluation results in Tables 1 and 2.

The powder of the present invention is also suitable for a 3D printer of a type such that the powder is jetted from a nozzle. This powder is also suitable for laser coating of a type such that the powder is jetted from a nozzle.

The invention claimed is:

1. A powder made of a Cu-based alloy, wherein the Cu-based alloy consists of:
    an element M being one or more elements selected from Cr, Fe, Ni, Zr, and Nb: 0.1% by mass or more and 10.0% by mass or less,
    Si: more than 0% by mass and 0.20% by mass or less,
    P: more than 0% by mass and 0.10% by mass or less, and
    S: more than 0% by mass and 0.10% by mass or less,
    the balance being Cu and inevitable impurities,
    wherein D50/TD being a ratio of an average particle diameter D50 of the powder to a tap density TD of the powder is $0.5 \times 10^{-5} \cdot m^4/Mg$ or more and $20 \times 10^{-5} \cdot m^4/Mg$ or less, and
    wherein the powder has a sphericity of 0.80 or more and 0.95 or less.

2. The powder according to claim 1, wherein the content of the element M is 0.2% by mass or more and 5.0% by mass or less.

3. The powder according to claim 1, wherein the content of the element M is 0.5% by mass or more and 3.0% by mass or less.

4. The powder according to claim 1, wherein the Si content is 0.10% by mass or less, the P content is 0.010% by mass or less, and the S content is 0.010% by mass or less.

5. The powder according to claim 1, wherein a metallographic structure of the Cu-based alloy has:
    a matrix phase rich in Cu,
    a grain boundary phase rich in the element M, and
    a compound $Cu_mM_n$, wherein m and n each represent a natural number, and a ratio of m/n is 4.0 or more, dispersed in the matrix phase and having a size of 1 nm or more and 300 nm or less,
    wherein a content of Cu in the matrix phase is 80% by mass or more and higher than a content of Cu in the grain boundary phase, and
    wherein a content of the element M in the grain boundary phase is 5% by mass or more and higher than a content of the element M in the matrix phase.

* * * * *